(12) United States Patent
Wada et al.

(10) Patent No.: US 8,193,682 B2
(45) Date of Patent: Jun. 5, 2012

(54) VEHICLE ALTERNATOR PROVIDED WITH BRUSHES, BRUSH HOLDER, AND SLIP RINGS

(75) Inventors: Hitoshi Wada, Fuwa-gun (JP); Hiroshi Ishida, Anjo (JP)

(73) Assignee: Denso Corporation, Kariya (JP)

(*) Notice: Subject to any disclaimer, the term of this patent is extended or adjusted under 35 U.S.C. 154(b) by 111 days.

(21) Appl. No.: 12/320,336

(22) Filed: Jan. 23, 2009

(65) Prior Publication Data
US 2009/0189478 A1    Jul. 30, 2009

(30) Foreign Application Priority Data

Jan. 28, 2008   (JP) ................................ 2008-016087

(51) Int. Cl.
  *H02K 9/28*   (2006.01)
  *H02K 9/00*   (2006.01)
  *H02K 27/00*   (2006.01)
(52) U.S. Cl. .................. 310/227; 310/228; 310/239
(58) Field of Classification Search .............. 310/227, 310/228, 238, 239; *H02K 9/28, 39/00, 27/00, H02K 27/24, 27/30, 9/00*
See application file for complete search history.

(56) References Cited

U.S. PATENT DOCUMENTS

| | | | |
|---|---|---|---|
| 3,171,050 A * | 2/1965 | Gordon | 310/239 |
| 5,424,600 A | 6/1995 | Ishikawa et al. | |
| 5,610,456 A * | 3/1997 | Wille et al. | 310/227 |
| 6,294,856 B1 | 9/2001 | Ishida et al. | |
| 6,486,584 B2 * | 11/2002 | Chang | 310/239 |
| 6,515,398 B1 * | 2/2003 | Fudono et al. | 310/239 |
| 6,664,699 B2 * | 12/2003 | Shioya et al. | 310/239 |
| 6,710,499 B2 * | 3/2004 | Tsuge | 310/227 |
| 2002/0047465 A1 | 4/2002 | Chang | |
| 2006/0273685 A1 * | 12/2006 | Wada et al. | 310/239 |

FOREIGN PATENT DOCUMENTS

| | | |
|---|---|---|
| JP | U-58-51663 | 4/1983 |
| JP | A-5-199701 | 8/1993 |
| JP | B2-7-32571 | 4/1995 |
| JP | A-7-123649 | 5/1995 |
| JP | A-2000-139058 | 5/2000 |
| JP | A-2006-340467 | 12/2006 |

OTHER PUBLICATIONS

Japanese Office Action issued in Japanese Patent Application No. 2008-016087 on Nov. 10, 2009. (with English Translation).
Search Report issued in counterpart British Patent Application No. GB 0901328.5 on May 1, 2009.

* cited by examiner

*Primary Examiner* — Quyen Leung
*Assistant Examiner* — Michael Andrews
(74) *Attorney, Agent, or Firm* — Oliff & Berridge, PLC (57) ABSTRACT

An alternator for vehicles, the alternator being provided with a rotary shaft, comprising slip rings fixed to a rotary shaft to be rotated with the rotary shaft, brushes being placed to be in slide contact with the slip rings a brush holder that accommodates the brushes to be held therein; connection terminals fixed to the brush holder, brush leads electrically connecting the brushes to the connection terminals respectively, and a slip ring cover that covers the slip rings in cooperation with the brush holder, wherein the brush holder comprises first chambers in which the bushes are fixedly accommodated second chambers in which the brush leads are accommodated, the second combers communicating with the first chambers, and first air holes formed to open outside of the housing and formed as inlet/exhaust passages communicating with the second chambers.

11 Claims, 8 Drawing Sheets

VEHICLE ALTERNATOR PROVIDED WITH BRUSHES, BRUSH HOLDER, AND SLIP RINGS

CROSS REFERENCES TO RELATED APPLICATION

The present application relates to and incorporates by reference Japanese Patent application No. 2008-016087 filed on Jan. 28, 2008.

BACKGROUND OF THE INVENTION

1. Field of the Invention

The present invention relates to a vehicle alternator (i.e., AC generator) mounted to vehicles such as automobiles and trucks.

2. Description of the Related Art

A typical vehicle alternator widely known comprises a stator, and a rotor that is disposed against the inner surface side of the stator, both of which are accommodated in a housing. The rotor is fixedly provided with a cooling fan that generates cooling air as the rotor rotates about a rotary shaft. The cooling air generated by the cooling fan is exhausted through an exhaust window provided to the housing. The rotary shaft is fixedly provided with slip rings that rotate with the rotary shaft. The vehicle alternator further comprises components such as a brush holder for accommodating brushes that are in sliding contact with the slip rings, and a rear cover for covering electric components accommodating the brushes.

The conventional vehicle alternator is required to have an airflow passage and to protect the brushes from getting wet, in order to prevent the brushes from wearing caused by the increased high temperature. A number of inventions have been proposed to pursue the same object. For example, Japanese unexamined utility model publication No. 58-51663 discloses a structure comprising mazy grooves that have a plurality of bending portions formed on an end face of a brush holder. Japanese examined patent publication No. 7-32571 discloses a construction that comprises a sealing member provided with cooling air passage between a brush holder and a rear cover. Japanese unexamined patent publication No. 5-199701 discloses a seal member having mazy cooling air passage formed by a plurality of bending portions. Further, Japanese unexamined patent publication No. 2000-139058 discloses a mazy structure constructed by a brush holder and a slip ring cover, a portion of the slip cover is inserted into a concave portion formed on the brush holder. also, Japanese unexamined patent publication No. 2006-340467 proposes a construction comprising a first air hole for connecting sliding portion of brush to the outside, and a second air hole for directly connecting chamber for brush to the outside, in order to inlet and exhaust the air around the sliding portion of the brush.

The aforementioned Japanese unexamined patent publication No. 2006-340467 is assumed effective to exhaust powder produced by sliding motion of the brushes. However, this construction has to supply the air into a very small gap formed between the brush and the chamber for brush. This decreases the amount of airflowing because of the increased resistance in the airflow, which requires an air inlet/exhaust apparatus to have a large bulk in order to supply sufficient airflow. Increasing the gap between the brush and the chamber for brush could decrease the resistance of the airflow. However, this proposal is unacceptable because such structure will increase rattling of the brush, thereby increasing wear and noise of the brush, during the slide movement of the brush. Further, the same Japanese unexamined patent publication introduces such a construction that the airflow is provided only to the chamber for brush at the rear side, leading to the chamber for the brush at the rear side to be cooled more than the other one at the front side. This causes the brush at the front side to have a shorter lifetime than the other one at the rear side. Consequently, this construction fails to allow the brushes to have the lifetime as long as it is initially expected.

SUMMARY OF THE INVENTION

The present invention has been invented in such a view, and it is therefore an object of the present invention to provide a vehicle alternator with increased amount of air for cooling a pair of brushes and for exhausting powders produced by sliding motion of the brushes. It is another object of the present invention to increase the lifetime of the pair of brushes and to improve the performance in exhausting the powder produced by sliding motion of the brushes, by individually providing a sufficient amount of air to each of the brushes.

An alternator for vehicles, the alternator being provided with a rotary shaft according to the present invention, which has been invented to overcome the above-mentioned problem, comprises slip rings fixed to a rotary shaft to be rotated with the rotary shaft, brushes being placed to be in slide contact with the slip rings a brush holder that accommodates the brushes to be held therein; connection terminals fixed to the brush holder, brush leads electrically connecting the brushes to the connection terminals respectively, and a slip ring cover that covers the slip rings in cooperation with the brush holder, wherein the brush holder comprises first chambers in which the bushes are fixedly accommodated second chambers in which the brush leads are accommodated, the second chambers communicating with the first chambers, and first air holes formed to open outside of the housing and formed as inlet/exhaust passages communicating with the second chambers.

Accordingly, the vehicle alternator is allowed to have a larger air passage compared to the conventional small gap formed between the brush and the first chamber, which can significantly increase the amount of air for cooling the sliding portions of the brushes and for removing the powder produced by sliding motion of the brushes. Further, the vehicle alternator allows the brush leads, which are electrically connected to the brushes, to be directly cooled, which prevents the temperature increase of both the brushes and the connection terminals. The prevention of the temperature increase of the connection terminals is able to prevent temperature increase of the brush holder to which the connection terminals are fixed. Consequently, such a construction can significantly decrease the temperature of the brushes, resulting in a long brush lifetime.

Preferably, the slip rings are composed of a pair of slip rings for electrical transmission, the brushes are composed of a pair of brushes each made to touch each of the slip rings, the brush leads are composed, brush by brush, of a pair of brushes, the first chambers are composed of a pair of first chambers in each of which each of the brushes is accommodated, the second chambers are composed of a pair of the second chambers in each of which each of the brush leads is accommodated, and first air holes are two in number, in which each of the first air holes are formed to directly communicate with each of the second chambers.

Further preferably, one of the first chambers is prepared for a positive electrode, and the other of the first chambers is prepared for a negative electrode; and one of the second chambers is prepared for the positive electrode, and the other of the second chambers is prepared for the negative electrode. Accordingly, the alternator is allowed to have a sufficient amount of air for cooling the brush at the front side as well as for the brush at the rear side, which can increase the lifetime of both brushes.

It is preferred that the first air holes have opening areas which are different from each other. Accordingly, the alternator can supply sufficient air to both the brush at the front side and the brush at the rear side, individually, based on the temperature difference between them caused by the positions of the brushes, by adjusting the opening area of each of the first air holes. This enables the lifetime of the brushes to be increased.

It is further preferred that the brush holder is provided with a second air hole, the second air hole is directly communicated with the sliding portions of the slip rings. It is also preferred that the alternator comprises a rear cover for covering electrical components accommodating the brushes, where the rear cover is provided at its end face with a cylinder in an axial direction, the cylinder is communicated with the first air hole. Further, It is preferred that the alternator comprises a rear cover for covering electrical components accommodating the brushes, the rear cover is provided at its end face with two cylinders both in an axial direction, one of the cylinders is communicated with the first air hole, and the other cylinder is communicated with the second air hole.

Accordingly, this construction having a simple structure allows air to be inlet and exhausted from/to the outside, which permits the lifetime of the brushes to be significantly increased, and the powder produced by sliding motion of the brushes to be sufficiently exhausted.

It is further preferred that the cylinder is connected to an inlet/exhaust apparatus disposed in the vehicle side via a connecting member. Accordingly, the inlet/exhaust apparatus is allowed to perform sufficient inletting and exhausting of the air, as well as the exhausting of powder produced by sliding motion of the brushes, which prevents the invasion of foreign objects and improves the mechanical environment of the vehicle alternator, even if the vehicle alternator operates under the over flooding condition.

DETAILED DESCRIPTION OF PREFERRED EMBODIMENTS

Figure 1:
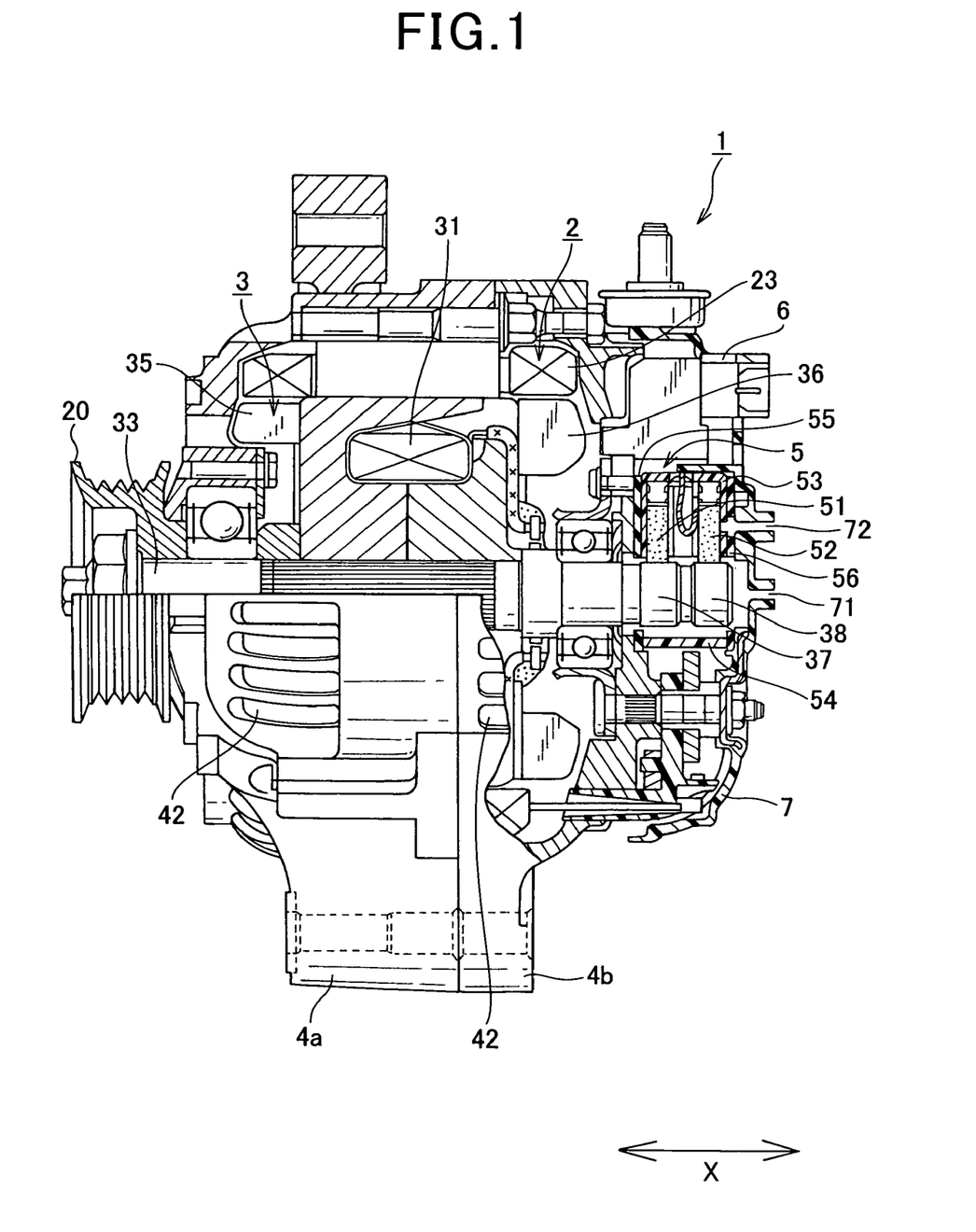
FIG. 1 is a sectional view showing a vehicle alternator of a first preferred embodiment of the present invention.
Figure 2:
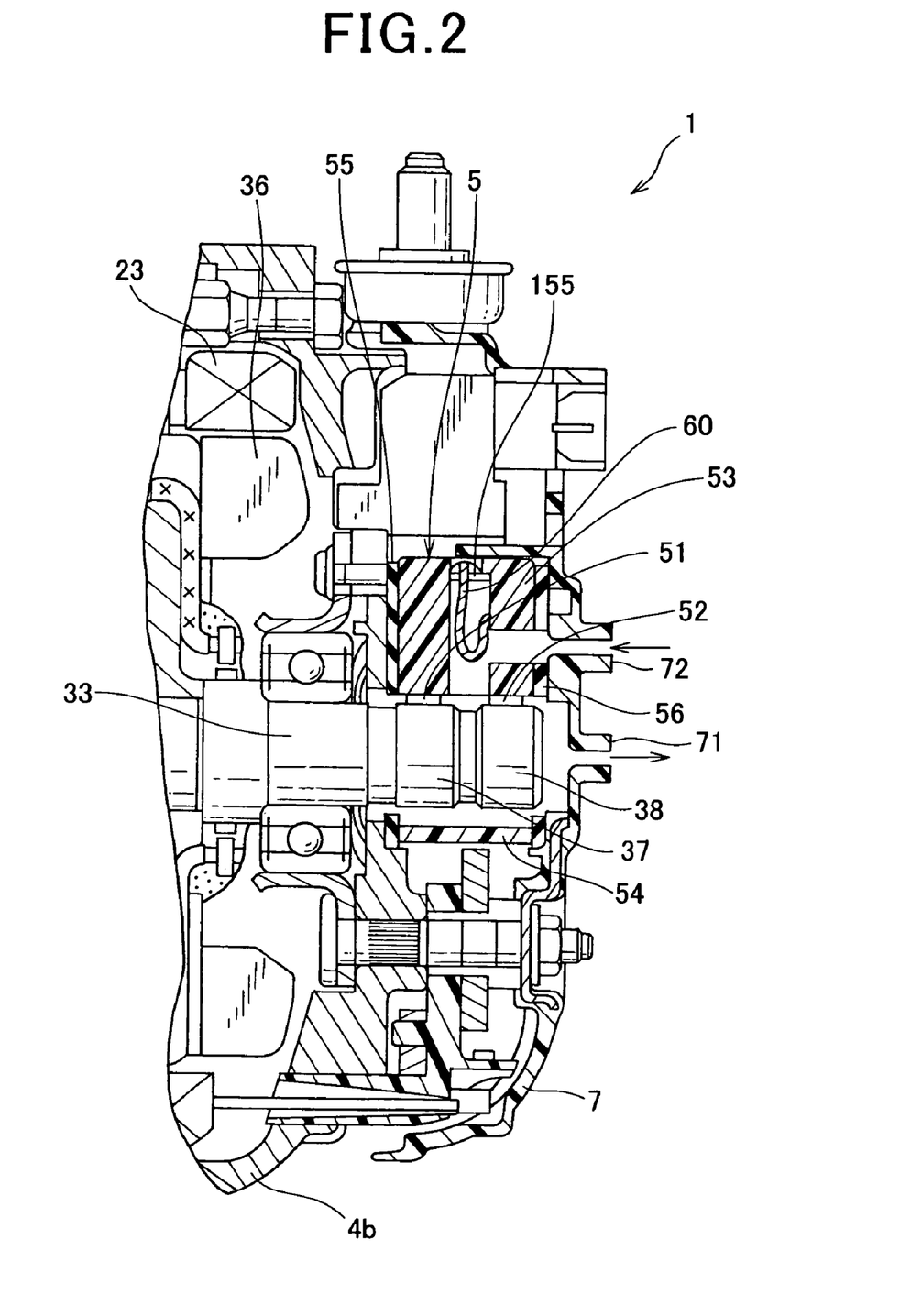
FIG. 2 is an enlarged sectional view showing a substantial part of the vehicle alternator of the first embodiment.

A vehicle alternator according to a preferred embodiment of the present invention will be described in detail referring to the drawings. FIG. 1 is a sectional view of the vehicle alternator according to the embodiment. FIG. 2 is an enlarged sectional view showing a substantial part of the vehicle alternator of the embodiment.

As illustrated in FIG. 1, the vehicle alternator 1 of the preferred embodiment comprises a stator 2 composed of a wire wound armature 23. The vehicle alternator 1 also comprises a rotor 3, which is composed of a field winding 31, and which is disposed against the inner circumference side of the stator 2. The vehicle alternator 1 further comprises cooling fans 35, 36, which are fixed to axial end faces of the rotor 3, and which function as a means for generating cooling air as the rotor 3 rotates. The vehicle alternator 1 also comprises a front-side housing 4a and a rear-side housing 4b that support the stator 2 and the rotor 3, a brush apparatus 5 for providing power to the field winding 31, a voltage control apparatus 6 for controlling output voltage to a predetermined value. The vehicle alternator further comprises a rear cover 7 that covers electrical components such as the brush apparatus 5 and the voltage control apparatus 6 to protect them from foreign objects, and a pulley 20 that transmits rotary driving force from an engine (not shown) to the rotor 3.

The front-side housing 4a is provided at its side portion with a plurality of cooling air exhaust windows 42. These cooling air exhaust windows 42 are provided to exhaust the cooling air to the outside of the front-side housing 4a, which is generated by the rotation of the cooling fan 35 disposed at the side of the pulley 20, and is flowing in the centrifugal direction. The rear-side housing 4b is provided at its side portion with a plurality of cooling air exhaust windows 42. These cooling air exhaust windows 42 function to exhaust the cooling air to the outside of the rear-side housing 4b, which is generated by the rotation of the cooling fan 36 disposed at the side of the rear cover 7, and is flowing in the centrifugal direction.

A pair of slip rings 37, 38 are fixedly provided to a rotary shaft 33 of the rotor 3 at its one end, which rotate with the rotary shaft 33. The brush apparatus 5 comprises a brush holder 53 that accommodates the slip rings 37, 38 and a pair of brushes 51 each of which is in slide contact with one of the slip rings 37, 38. The brush apparatus 5 also comprises a slip ring cover 54 that covers the outer circumference of the slip rings 37, 38 in cooperation with the brush holder 53. The brush apparatus further comprises a pair of seal members 55, 56 that are provided at the axial end of the brush holder 53 and the slip ring cover 54. The seal members 55, 56 improve the sealing property of a space provided around the slip rings 37, 38. The seal members 55, 56 are made of plate-shaped rubbers.

The rear cover 7 is mounted to cover such electrical components in order to protect them from foreign objects that accommodate the brushes 51, 52, particularly the brush apparatus 5 and the voltage control apparatus 6 which are mounted outside the rear-side housing 4b. The rear cover 7 is made of resin, and comprises a first cylinder 71 and a second cylinder 72 that inlet and exhaust the air to/from the inside of the brush apparatus 5. In this embodiment, the first cylinder 71 is used to exhaust the air, while the second cylinder 72 is used to inlet the air.

Figure 3:
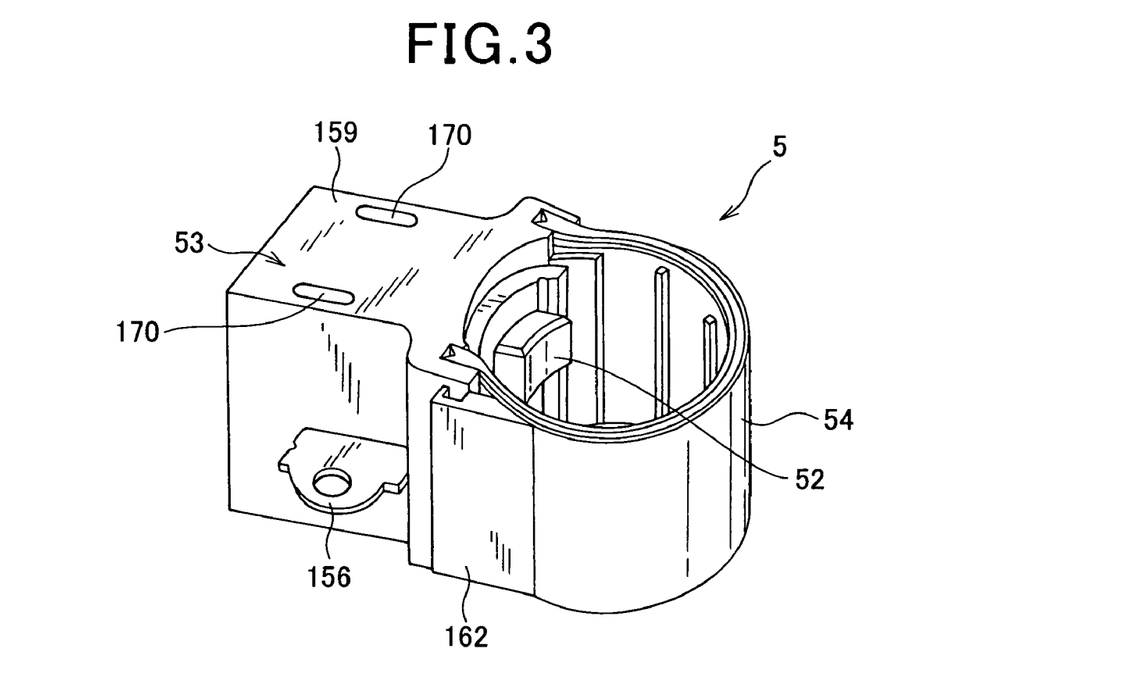
FIG. 3 is a perspective view showing a brush apparatus having a brush holder and a slip ring cover combined together.
Figure 4:
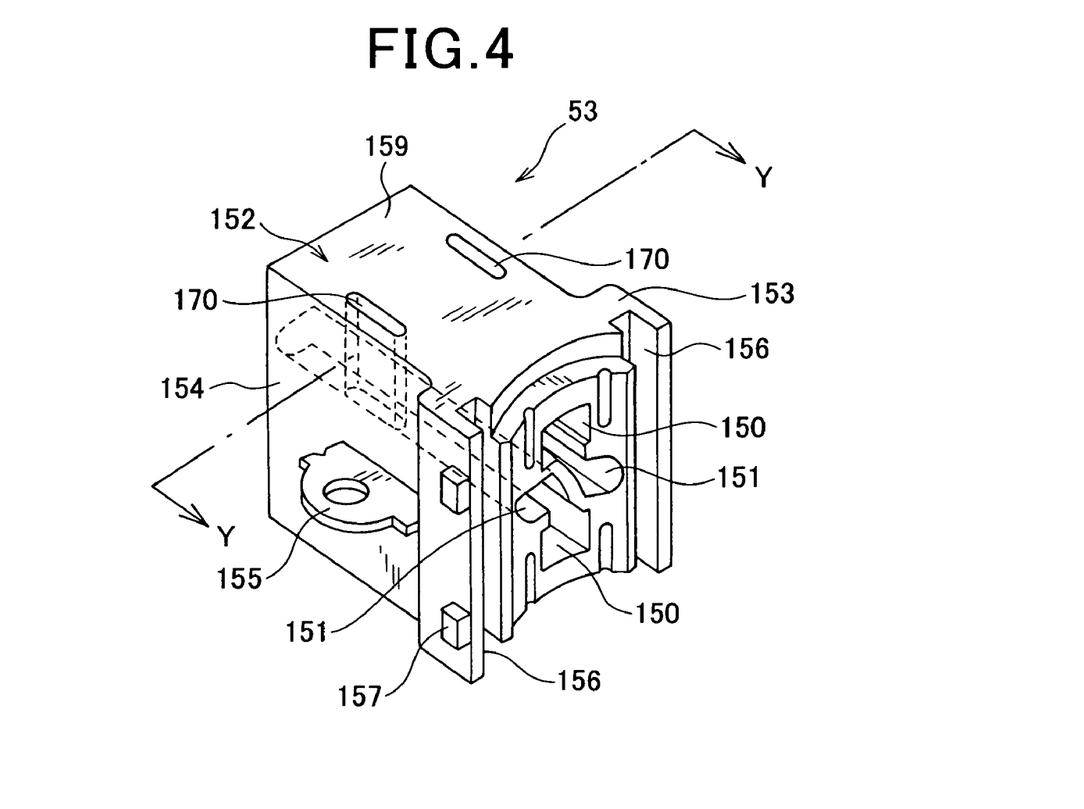
FIG. 4 is a perspective view showing a brush holder before brushes are mounted thereto.
Figure 5:
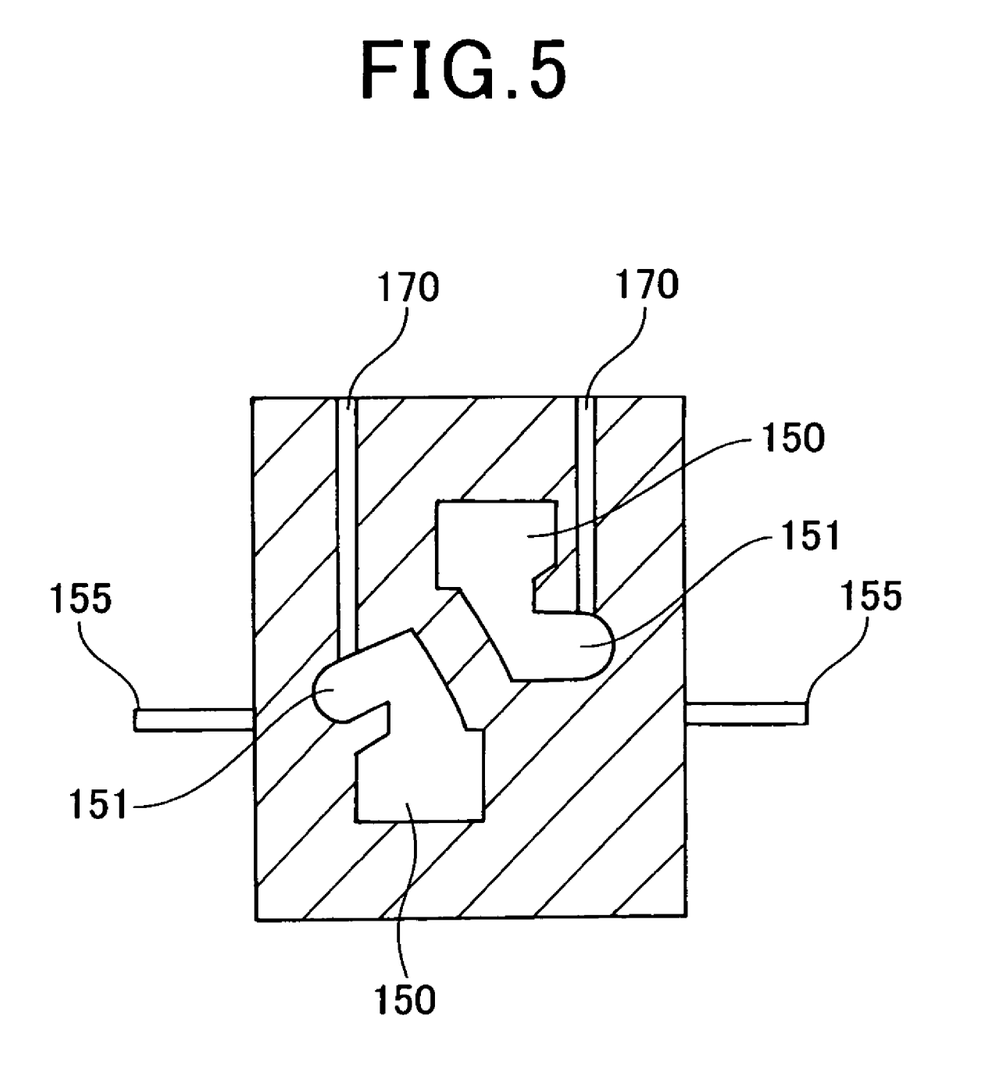
FIG. 5 is a cross section at arrow Y-Y of FIG. 4.
Figure 6:
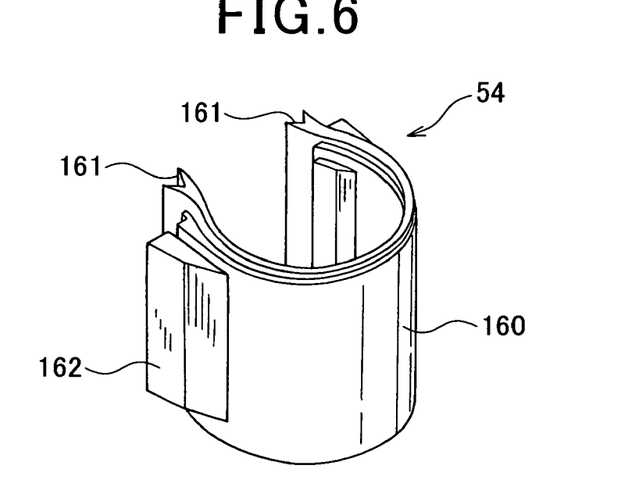
FIG. 6 is a perspective view showing the slip ring cover.
Figure 7:
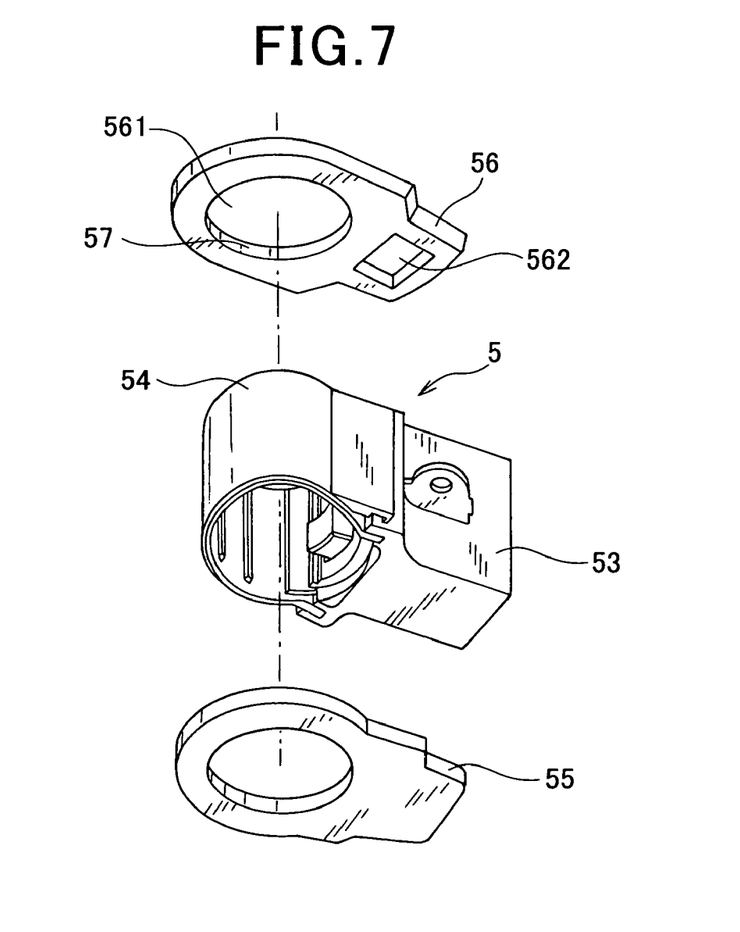
FIG. 7 is a perspective view showing a positional relation among seal members, the brush holder, and the slip ring cover.

The brush holder 53 and its circumference structure will be described in detail. FIG. 3 is a perspective view showing the brush apparatus 5 in which the brush holder 53 and the slip ring cover 54 are combined together. FIG. 4 is a perspective view showing the brush holder 53 before the brushes 51, 52 are mounted to. FIG. 5 is a cross section at arrow Y-Y of FIG. 4. FIG. 6 is a perspective view showing the slip ring cover 54. FIG. 7 is a perspective view showing a positional relation among the seal members 55, 56, the brush holder 53, and the slip ring cover 54.

The brush holder 53 made of thermosetting resin comprises a box member 152 that is provided with first chambers for brushes 150, 150 used for accommodating the brushes 51, 52, and second chambers 151, 151 used for accommodating brush leads 60, 60. The box member 152 comprises a thick portion at the side of the slip rings 37, 38, which has a concavely curved configuration along the outer circumference of the slip rings 37, 38, enlarging the surface area of the box member 152. The box member 152 of the brush holder 53 is provided at its both radial side surfaces 154, 154 with positive and negative connection terminals 155, 155 made of metal plates, each integrally molded to the box member 152 and projecting from the corresponding side surface 154. A portion of each connection terminal 155 is exposed in the second chamber 151, and is connected to the edge portion of the brush lead 60 by soldering. Each brush lead 60 electrically connects the brush 51 or 52 with the corresponding connection terminal 155. The thick portion 153 having a concavely curved surface is provided at both of radial side portions with concave portions 156, 156, each having a rectangular shape in section, along its entire axial length. The thick portion 153 is also provided at its both radial side surfaces with two convex portions 157, 157, respectively. The box member 152 comprises a air hole 170 on the upper surface 159 thereof, which is communicated with the second chamber 151. In this embodiment, two air holes 170 are provided; one directly communicating with the second chamber 151 used for accommodating the brush 52 at the rear side, and the other directly communicating with the second chamber 151 used for accommodating the brush 51 at the front side. The brush holder 53 exemplified in FIG. 4 has the first air hole 170 above the middle portion of the second chamber 151. The position of the air hole 170, however, can be relocated.

The slip ring cover 54 functions to cover and protect the slip rings 37, 38 provided at one end of the rotary shaft 33. The slip ring cover 54 has such a configuration that one-fourth of entire cylinder circumference is removed, remaining three-fourth of the cylinder circumference in section in the radial direction. The slip ring cover 54 made of resin (for example, nylon) is composed of a peripheral wall 160 having a roughly cylindrical shape formed by the three-fourth circumference of a circle. The peripheral wall 160 is provided at its both circumference sides with V-shaped convex portions 161, 161, each is relatively thin and is extending in the axial direction, and is to be engaged with the corresponding concave portion 156 of the brush holder 53. A hook-shaped projection 162 is formed at the outside of each of the V-shaped convexes 161, 161, which is to be engaged with the corresponding convex portion 157 of the brush holder 53.

The first cylinder 71 provided to the rear cover 7 is disposed at such a position that allows the interior space, which accommodates the sliding portions of the slip rings 37, 38 in slide contact with the brushes, to communicate with the outside. The second cylinder 72 is disposed at such a location that allows the second chamber 151 in the brush holder 53 to communicate with the outside of the rear cover 7 through the first air hole 170. The second cylinder 72 is disposed against the first air hole 170 that is formed at the upper surface 159 of the box member 152 of the brush holder 53. The second cylinder 72 in combination with the air hole 170 forms an inlet passage that connects the second chamber 151 with the outside. As shown in FIG. 7, the seal member 56 has an opening 561 at a location corresponding to the first cylinder 71, and has another opening 562 at a location corresponding to the second cylinder 72. The opening 561 is directly communicated with the sliding portions of the slip rings 37, 38 to function as a second air hole.

Figure 8:
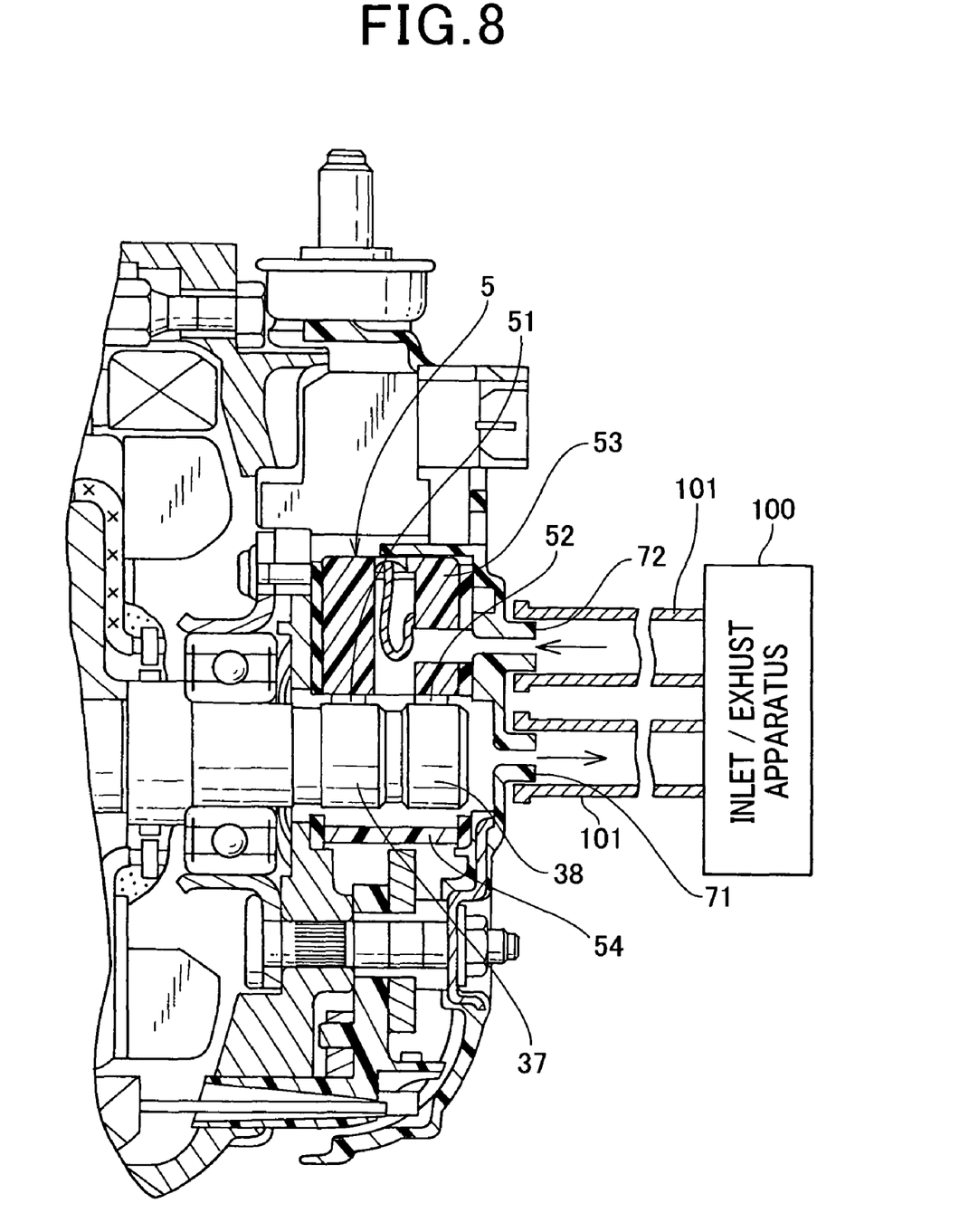
FIG. 8 is a partial sectional view showing the vehicle alternator connected with an inlet/exhaust apparatus.

FIG. 8 is a drawing showing the vehicle alternator 1 according to this embodiment connected to an inlet/exhaust apparatus 100. The first cylinder 71 and the second cylinder 72 are connected to the inlet/exhaust apparatus 100 mounted to a vehicle via a tubular connecting member 101 to forcefully inlet and exhaust the air, which allows the air to flow sufficiently as well as the evacuation of the powder produced by the sliding motion of the brushes 51, 52 to be sufficiently completed, led by the inlet/exhaust apparatus 100. Accordingly, such construction prevents foreign objects from entering into the vehicle alternator 1 and improves the mechanical environment of the vehicle alternator even it is used under the overhead flooding condition.

As described above, the rear cover 7 of the vehicle alternator 1 according to the preferred embodiment comprises the second cylinder 72 that allows the second chamber 151 of the brush holder 53 to communicate with the outside. The rear cover 7 also comprises the first cylinder 71 that allows the sliding portions of the slip rings 37, 38 to communicate with the outside. Accordingly, the air is supplied to and exhausted from the interior space of the brush holder 53 by the first cylinder 71 and the second cylinder 72. Consequently, this construction can completely prevent foreign objects from reaching the brushes 51, 52 and their adjacent surroundings even when the interior space of the vehicle alternator 1 is flooded.

The seal member 56 is disposed between the brush holder 53 and the rear cover 7 in order to seal the interior space surrounding the sliding portions of the brushes 51, 52. The seal member 56 is provided with the openings 561, 562 at the positions opposing to the first cylinder 71 and the second cylinder 72, respectively. The brush holder 53 is provided at its one face (the upper surface 159) with the air holes 170, 170 that communicate with the second chambers 151, 151. Accordingly, such construction sufficiently seals between the brush holder 53 and the rear cover 7, besides performing the sufficient prevention of foreign objects' invasion and the improvement of the mechanical environment of the vehicle alternator.

The inlet of the air by the second cylinder 72 and the outlet of the air by the first cylinder 71 cause the sliding portions of the brushes 51, 52 to be directly cooled by air having relatively low temperature. This prevents the brushes 51, 52 from wearing, and eliminates the powder produced by the sliding motion of the brushes 51, 52 through the first cylinder 71.

Figure 9:
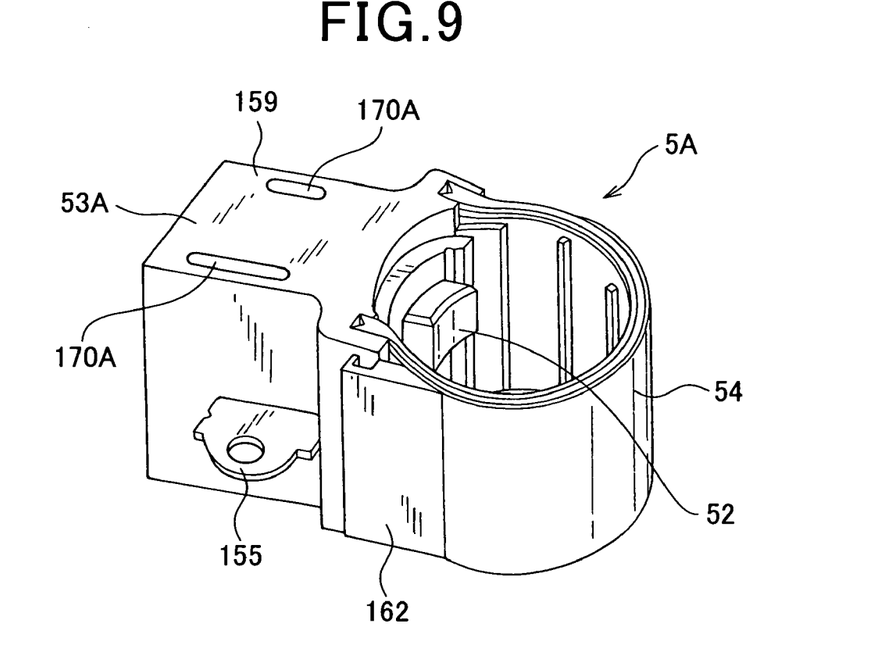
FIG. 9 is a perspective view showing a brush apparatus having a modified brush holder and the slip ring cover combined together.
Figure 10:
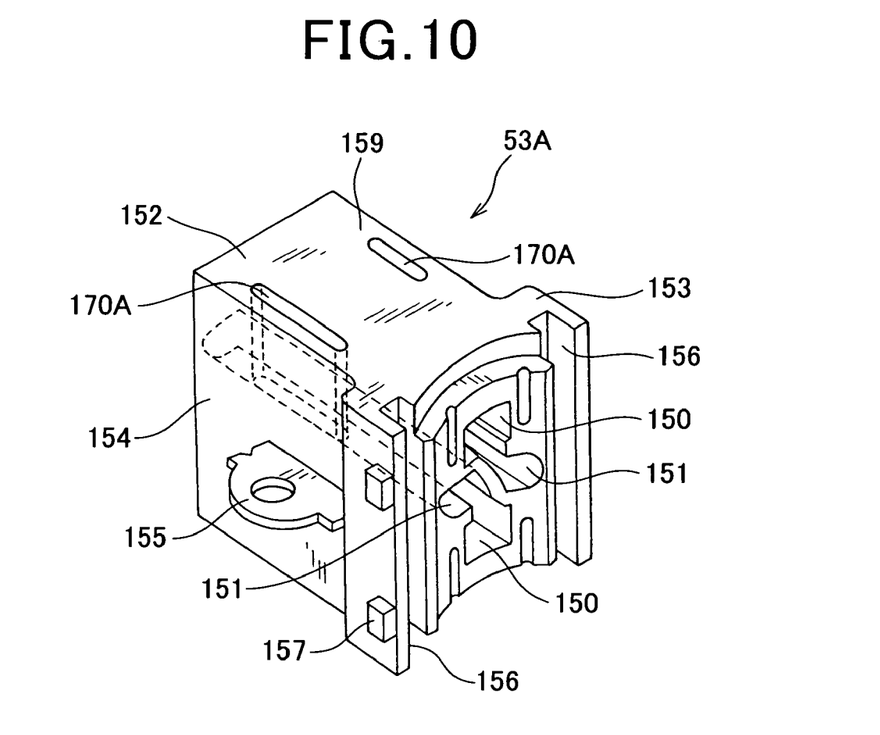
FIG. 10 is a perspective view showing the modified brush holder before the brushes are mounted thereto.

While the present invention has been disclosed in terms of the preferred embodiment in order to facilitate better understanding thereof, it should be appreciated that the invention can be embodied in various ways without departing from the principle of the invention. FIG. 9 is a perspective view showing a modified brush apparatus 5A in which a modified brush holder 53A and the slip ring cover 54 are combined together. FIG. 10 is a perspective view showing the modified brush holder 53A before the brushes 51, 52 are mounted to it.

The modified brush holder 53A shown in FIGS. 8 and 9 is provided with a modified pair of air holes 170A, 170A having different opening spaces. In general, the brush 51 at the front side disposed closer to heat generating components such as the stator 2 and the rotor 3 has inferior cooling performance compared to the brush 52 at the rear side. Therefore, in this modified configuration, the first air hole 170A communicating with the second chamber 151 that accommodates the brush 51 at the front side is provided with a large opening space compared to the other first air hole 170A. Such construction allows the pair of brushes 51, 52 to be cooled evenly.

Figure 11:
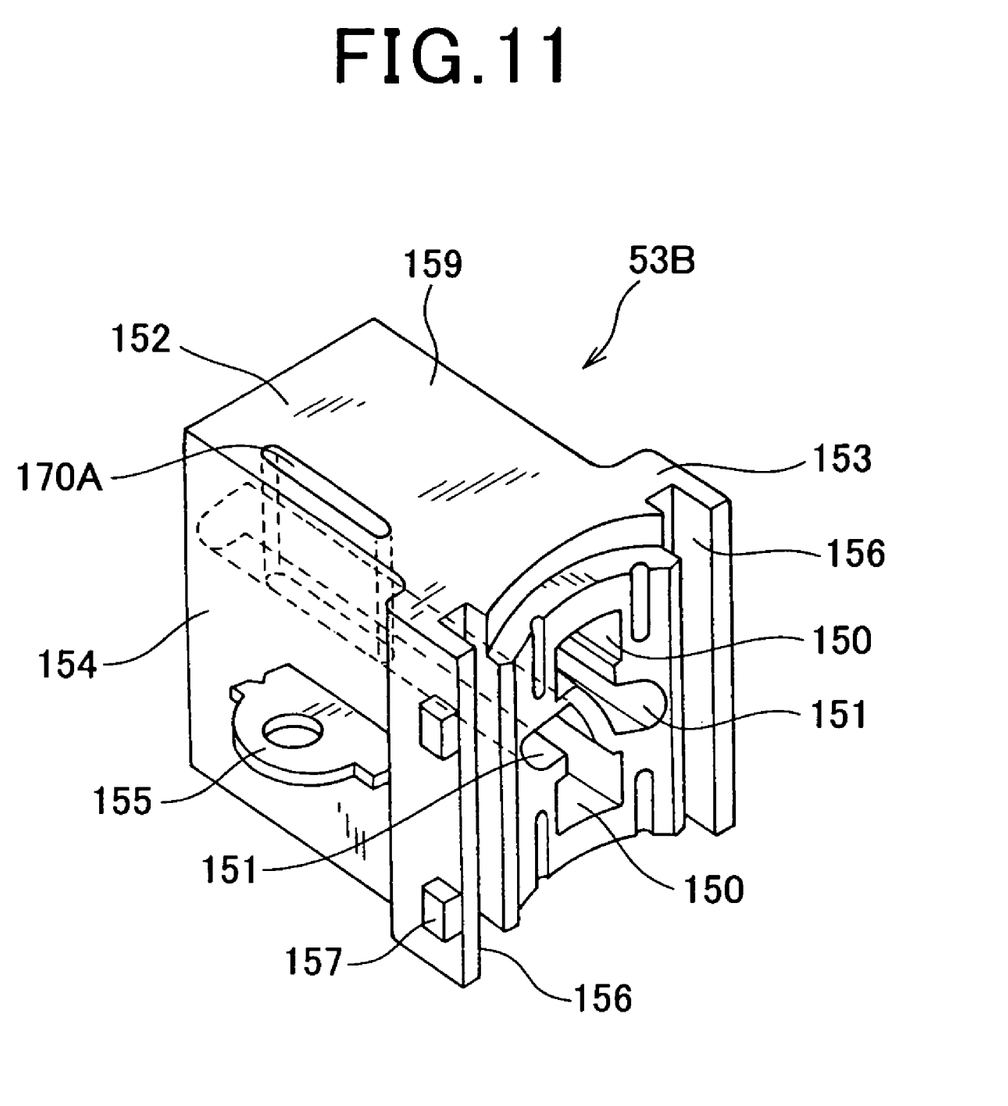
FIG. 11 shows an example deformation of a brush holder before the brushes are mounted thereto.

FIG. 11 shows an example deformation of a brush holder 53B before the brushes are mounted thereto. In the example deformation, only one air hole 170B is provided. In this case, the second chambers 151, 151 may be partially communicated.

What is claimed is:

1. An alternator for vehicles, comprising:
a rotary shaft;
two slip rings fixed to the rotary shaft to be rotated together with the rotary shaft;
two brushes placed to be in slide contact with the slip rings;
a brush holder that accommodates the brushes to be held therein, the brush holder being made of thermosetting resin;
positive-side and negative-side connection terminals fixed to the brush holder;
two brush leads electrically connecting the brushes and the connection terminals, respectively; and
a slip ring cover that covers the slip rings in cooperation with the brush holder, wherein
the brush holder is shaped to have
a pair of first chambers in which the brushes are accommodated, respectively,
a pair of second chambers in which the brush leads are accommodated, respectively, and
two first air holes each having two ends, one end thereof being directly open to a corresponding one of the second chambers and the other end thereof being directly open outside at a face of the brush holder.

2. The alternator according to claim 1, wherein the two first air holes are communicated, respectively, with a space in which the brushes slide on the slip rings.

3. The alternator according to claim 1, wherein the two first air holes are straight in shape.

4. The alternator according to claim 3, wherein both ends of each of the two first air holes have opening areas, the opening areas of the one ends of the two first air holes being different from each other and the opening areas of the other ends of the two first air holes being different from each other.

5. The alternator according to claim 3, wherein the brush holder is provided with a second air hole, and the second air hole is directly communicated with a space in which the slip rings are fixed on the rotary shaft.

6. The alternator according to claim 5, wherein the alternator further comprises a rear cover for covering electrical components including the brushes,
wherein the rear cover has an end face and two cylinders each having a through-hole formed therethrough and extending in an axial direction of the rotary shaft, one of the cylinders being positioned to allow the through-hole thereof to be communicated with the first air holes, and the other of the cylinders being positioned to allow the through-hole thereof to be communicated with the second air hole.

7. The alternator according to claim 6, wherein the cylinders are connected to an inlet/exhaust apparatus disposed in a vehicle via a connecting member.

8. The alternator according to claim 3, further comprising a rear cover for covering electrical components including the brushes,
wherein the rear cover has an end face and a cylinder having a through-hole formed therethrough and extending in an axial direction of the rotary shaft, the cylinder being positioned to allow the through-hole thereof to be communicated with the first air holes.

9. The alternator according to claim 8, wherein the cylinder is connected to an inlet/exhaust apparatus disposed in a vehicle via a connecting member.

10. An alternator for vehicles, comprising:
a rotary shaft;
two slip rings fixed to the rotary shaft to be rotated together with the rotary shaft;
two brushes placed to be in slide contact with the slip rings;
a brush holder that accommodates the brushes to be held therein;
positive-side and negative-side connection terminals fixed to the brush holder;
two brush leads electrically connecting the brushes and the connection terminals, respectively;
a slip ring cover that covers the slip rings in cooperation with the brush holder;
a rear cover for covering electrical components including the brushes, wherein the brush holder is shaped to have:
two first chambers in which the brushes are fixedly accommodated,
two second chambers in which the brush leads are accommodated, the second chambers communicating with the first chambers, respectively, and
two first air holes formed through a body of the brush holder, each of the two first air holes being formed to have two ends, one end of each of the two first air holes thereof being directly open to a corresponding one of the second chambers and the other end of each of the two first air holes thereof being directly open outside at a face of the brush holder, the first air holes serving as inlet/exhaust passages to and from the second chambers, respectively,
both ends of each of the two first air holes have opening areas, the opening areas of the one ends of the two first air holes being different from each other and the opening areas of the other ends of the two first air holes being different from each other,
the brush holder is provided with a second air hole, and the second air hole is directly communicated with a space in which the slip rings are fixed on the rotary shaft, and
the rear cover has an end face and a cylinder having a through-hole formed therethrough and extending in an axial direction of the rotary shaft, the cylinder being positioned to allow the through-hole thereof to be communicated with the first air holes.

11. An alternator for vehicles, comprising:
a rotary shaft;
two slip rings fixed to the rotary shaft to be rotated together with the rotary shaft;
two brushes placed to be in slide contact with the slip rings;
a brush holder that accommodates the brushes to be held therein;
positive-side and negative-side connection terminals fixed to the brush holder;
two brush leads electrically connecting the brushes and the connection terminals, respectively;
a slip ring cover that covers the slip rings in cooperation with the brush holder; and a rear cover for covering electrical components including the brushes, wherein the brush holder is shaped to have:
two first chambers in which the brushes are fixedly accommodated,
two second chambers in which the brush leads are accommodated, the second chambers communicating with the first chambers, respectively, and
two first air holes formed through a body of the brush holder, each of the two first air holes being formed to have two ends, one end thereof being directly open to a corresponding one of the two second chambers and the other end thereof being directly open outside at a face of the brush holder, the first air holes serving as inlet/exhaust passages to and from the second chambers, respectively,
both ends of each of the two first air holes have opening areas, the opening areas of the one ends of the two first air holes being different from each other and the opening areas of the other ends of the two first air holes being different from each other,
the brush holder is provided with a second air hole, the second air hole is directly communicated with a space in which the slip rings are fixed on the rotary shaft, and
the rear cover has an end face and two cylinders each having a through-hole formed therethrough and extending in an axial direction of the rotary shaft, one of the cylinders being positioned to allow the through-hole thereof to be communicated with the first air holes, and the other of the cylinders being positioned to allow the through-hole thereof to be communicated with the second air hole.

* * * * *